United States Patent [19]

Barabino

[11] 4,186,377
[45] Jan. 29, 1980

[54] METHOD AND APPARATUS FOR MONITORING TIRE PRESSURE

[75] Inventor: William A. Barabino, North Reading, Mass.

[73] Assignee: Safety Research & Engineering Corporation, North Reading, Mass.

[21] Appl. No.: 858,842

[22] Filed: Dec. 8, 1977

Related U.S. Application Data

[63] Continuation-in-part of Ser. No. 665,889, Mar. 11, 1976, abandoned.

[51] Int. Cl.² ............... B60C 23/02; G08B 21/00
[52] U.S. Cl. .................... 340/58; 73/146.5; 116/34 R; 200/61.25; 235/92 T
[58] Field of Search .......... 340/58, 558, 560, 565, 340/566, 1 C, 3 F; 116/34 R; 200/61.22, 61.25; 73/146.4, 146.5; 235/92 T, 92 TF, 92 CM

[56] References Cited

U.S. PATENT DOCUMENTS

| 3,296,590 | 1/1967 | Dalton | 340/58 |
|---|---|---|---|
| 3,513,463 | 5/1970 | Stevenson et al. | 340/258 |
| 3,691,549 | 9/1972 | Wilson | 340/261 |
| 3,713,092 | 1/1973 | Ivenbaum | 340/58 |
| 3,721,972 | 3/1973 | Hermans | 340/276 |
| 3,835,447 | 9/1974 | Lowrance | 340/3 R |
| 3,890,595 | 6/1975 | Barabino | 340/58 |
| 3,934,223 | 1/1976 | Barabino | 340/58 |

Primary Examiner—John W. Caldwell, Sr.
Assistant Examiner—Joseph E. Nowicki
Attorney, Agent, or Firm—Morse, Altman, Oates & Bello

[57] ABSTRACT

A method and apparatus are provided for monitoring tire pressure for motor vehicles, or the like, in which coded sound signals emitted from a wheel-mounted sound signal generator are detected and processed. The coded signal from the generator serves to distinguish the sound signal from background noise. The output of the generator is comprised of at least two coherent frequencies that beat acoustically with one another to produce an amplitude modulated sound signal that is then detected by a transducer which converts the sound signals into the electrical signals. The electrical signals are then fed through the processing circuitry including a detector which extracts the modulation envelope and applies it to an audio band-pass filter. The filter accepts the envelope within a predetermined frequency range, eliminating all signals which are not within the designed band pass. A second detector converts the audio signal to a DC level and feeds it to a threshold comparator. The level of the DC signal is directly proportional to the percentage of modulation of the originally received signal. If this level exceeds the threshold value of the comparator, the output actuates a bistable device, which, in turn, actuates a warning indicator.

The rate of loss of tire pressure may also be determined by means of a signal generator adapted to emit at least two time-spaced sound signals at different pressures. The two signals are detected and processing circuitry calculates the time and/or pressure remaining before the vehicle becomes immobile. This information is displayed to the operator.

6 Claims, 10 Drawing Figures

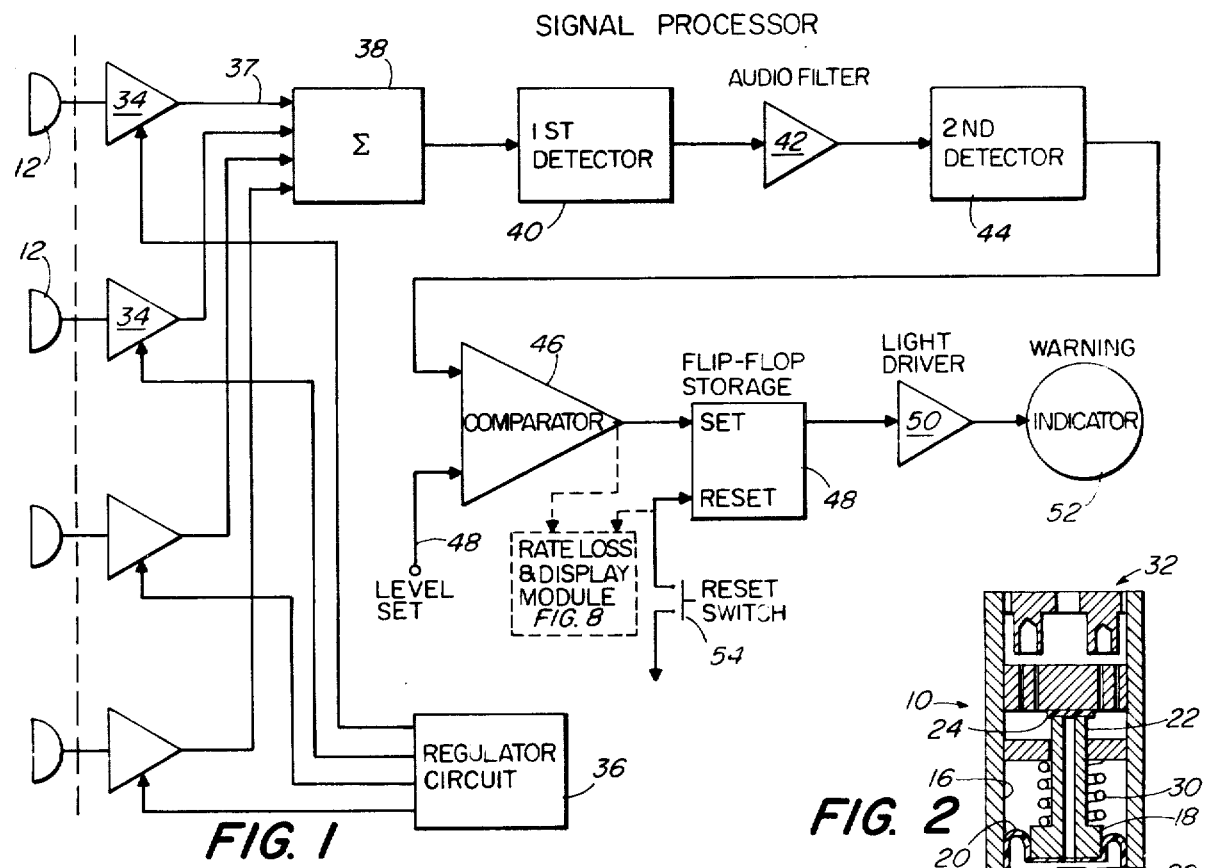
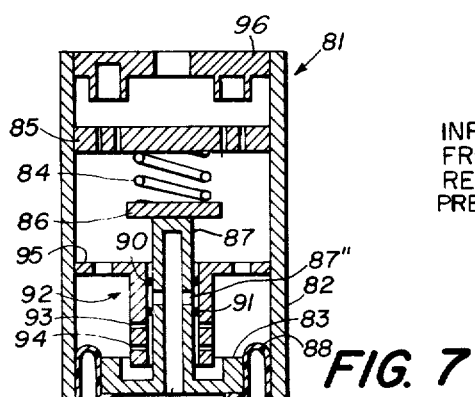
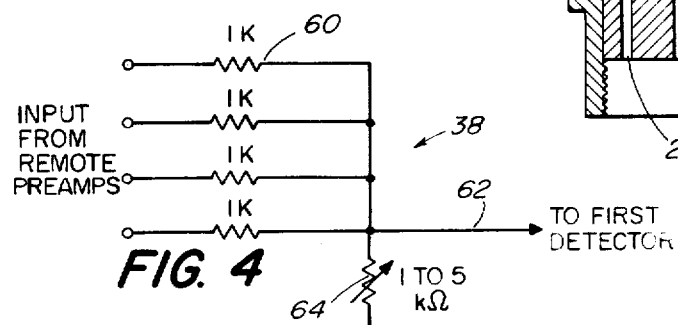
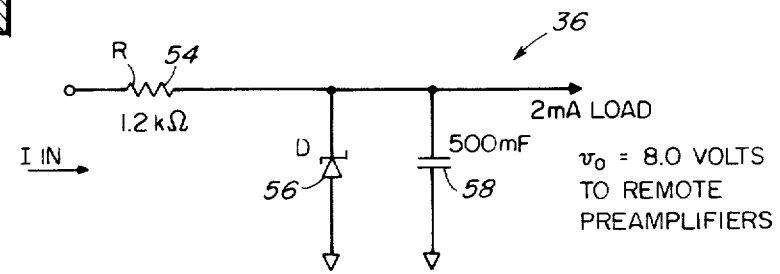

METHOD AND APPARATUS FOR MONITORING TIRE PRESSURE

CROSS-REFERENCE TO RELATED APPLICATION

This is a continuation-in-part of U.S. Application Ser. No. 665,889, filed Mar. 11, 1976, and entitled "Method and Apparatus for Monitoring Tire Pressure" now abandoned.

BACKGROUND OF THE INVENTION

1. Field of the Invention

This invention relates generally to tire pressure monitoring systems, and more particularly is directed towards a new and improved method and apparatus for monitoring tire pressure in which a sound signal from a tire pressure signal-generating device is uniquely coded and processed to distinguish it from background noise for the purpose of preventing false alarm signals. This invention also relates to a tire pressure monitoring system adapted to calculate the rate of loss of tire pressure in a leaking tire and indicate the time remaining until the vehicle becomes immobile.

2. Description of the Prior Art

It is known that the pressure of a pneumatic tire may be monitored for either low or high pressure by means of a device mounted to the wheel and adapted to generate a sound signal upon the occurrence of a high or low pressure event. The sound signal is then detected by a transducer forming part of a processing system for actuating an alarm device to alert the driver of a vehicle. By way of example, U.S. Pat. Nos. 3,489,998; 3,738,308; 3,890,595 and 3,934,223 show systems of this type. In these systems, measures have been considered to prevent false signals resulting from background noise rather than actual sound signals from the wheel device by means of filtering techniques. In such systems the sound signal generating devices are set to emit a predetermined frequency which is detected and filtered by appropriate electronic circuitry. However, such systems, while effective over a wide range of ambient noise conditions, nevertheless may be subject to responding to false signals which may occur from background noise within the predetermined frequency range. By way of example, tire squeal, transmission sounds, brake squeal and the like, which fall within the selected frequency range may trip the system and produce a false alarm signal.

It is an object of the present invention to provide improvements in systems of the foregoing type, and more particularly to provide a novel method and associated apparatus for coding and detecting signals from a sound signal generator in such a manner to actuate the signal sensing and processing system to the exclusion of all other ambient undesired acoustical signals.

Another object of this invention is to provide a tire pressure monitoring system adapted to detect rate of pressure loss and indicate the remaining time and/or pressure before the tire renders the vehicle immobile.

SUMMARY OF THE INVENTION

This invention features a method and apparatus for monitoring pneumatic tire pressure through the use of sound signals that allow discrimination between a low or high pressure warning signal and ambient noise. The method involves a coded sound output of a tire pressure sensing device by amplitude modulation produced by the beating of at least two discrete emission frequencies, detecting the sound signals and converting them to electrical signals, extracting the modulation envelope of the electrical signal, filtering the envelope within a predetermined frequency range, converting the audio signal to a DC signal directly proportional to the modulation of the original signal, and comparing the DC signal with a reference level to provide an alarm signal.

This invention also features an apparatus for monitoring tire pressure by coded sound signal means, comprising a sound signal generating device connected to a pneumatic tire and adapted to generate at least two different, discrete and coherent frequencies which combine to provide an amplitude modulated coded sound signal, a transducing device adapted to convert the coded sound signal to an electrical signal, a combining network receiving amplified signals from each transducer, a first detection stage adapted to extract the modulation envelope to provide an audio signal, an audio filter adapted to pass signals only within a predetermined frequency range, a second detecting stage adapted to convert the filtered signal to a DC level directly proportional to the percentage of modulation of the original signal, a comparator receiving the output of the second detecting stage and adapted to produce an output if the DC level exceeds a preset threshold level, a flip-flop responsive to the output of the comparator, and a warning device such as a light or audio alarm.

This invention further features the method and associated apparatus for determining the rate of loss of tire pressure by measuring the elapsed time between two coded signals emitted by a tire pressure sensing device at different tire pressures, calculating the remaining time and/or pressure before the vehicle is immobile, while continuously displaying this variable information to the operator.

BRIEF DESCRIPTION OF THE DRAWINGS

FIG. 1 is a block diagram of a signal processing system made according to the invention, FIG. 2 is a sectional view in side elevation of a tire pressure signalling device, FIG. 3 is a circuit diagram of a zener regulator employed in the processor, FIG. 4 is a circuit diagram of the summing network employed in the processor, FIG. 7 is a sectional view in side elevation of a tire pressure signalling device adapted to emit time-spaced signals at different pressures for use in determining rate loss.

DETAILED DESCRIPTION OF THE PREFERRED EMBODIMENTS

Figure 5:
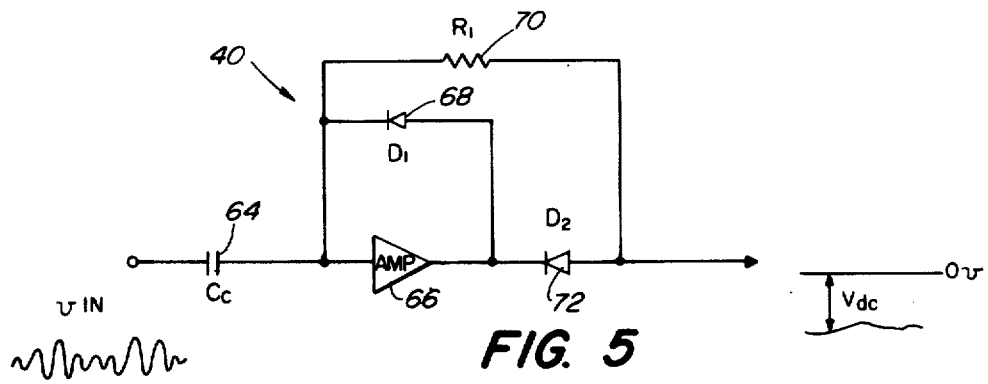
FIG. 5 is a circuit diagram of the first detector stage employed in the processor.

Referring now to the drawings and to FIGS. 1 and 2 in particular, there is illustrated in block diagram a system adapted to monitor the pressure in pneumatic tires mounted on an automobile, or the like, in order to warn the driver whenever the tire pressure exceeds a predetermined limit. The system of FIGS. 1 and 2 features a coding technique by means of which a sound signal emitted from any one of a number of tire pressure signalling devices 10, one of which is mounted to each wheel of the vehicle, is coded and processed in such a manner that the sound signal is distinguishable from background noise. Essentially the system involves the device 10 adapted to emit, when actuated by an abnormal pressure condition, at least two frequencies that beat against one another to produce an amplitude-modulated sound signal. This signal is detected by means of a transducer 12 which converts the sound signal into an electrical signal. The electrical signal is then processed to extract the modulation envelope and detect the presence or absence of a true signal representing a tire pressure event.

The term "sound" as used herein is intended to include all sound frequencies from infrasonic and audio through ultrasonic and hypersonic.

The device 10, as shown in FIG. 2, generally may be of a configuration such as shown in co-pending application Ser. No. 627,959, filed Nov. 3, 1975, and assigned to the same assignee as the present application. The device 10 is designed to be mounted to a wheel of a vehicle carrying a pneumatic tire and may be attached either to the air filling stem of the tire, or may be separately mounted through the wheel to communicate directly with the interior of the tire. In either event, the device 10 includes a housing 14 having an internal cylindrical chamber 16 in which is mounted a piston 18 connected to the walls of the cylinder by means of a rolling seal diaphragm 20. The piston 18 is provided with a hollow stem 22, the upper end of which seats against a pad 24 and is the normal operating closed position of the device. The lower end of the device communicates through a passage 26 with the interior of the tire passing over a valve seat 28 at the lower end of the cylinder opposite the lower end of the piston passage. A coil spring 30 engages the piston and has a selected force such that the piston will remain raised in the illustrated position as long as the pressure within the tire is above a minimum operating range. In the event there is a reduction of tire pressure below a preset level, the spring will force the piston down, opening up the top of the stem passage and releasing air to a multi-tone sound signal generator 32 at the top of the device. As the pressure drops, the piston will also drop until it closes against the seat 28, thereby stopping any further loss of air through the device and also stopping the emission of sound signals.

The sound signal generator 32 is designed to emit at least two different simultaneous, obsolete frequencies, which frequencies are determined by the configuration of the sound signal generator. The two frequencies beat against one another and form an amplitude-modulated envelope representing the frequency difference between the two carriers. Both frequencies are carrier signals but nevertheless produce amplitude modulation by beating against one another. The two-frequency emission represents a coding which uniquely identifies the signal and serves to distinguish the generator signal from substantially all background noise which may be produced artificially or naturally, virtually eliminating the possibility of false signals actuating the system.

The dual frequencies which are emitted by one of the devices 10, as the result of a low tire pressure event, is detected by one of the transducers 12 as shown in FIG. 1. In practice, the microphone may be mounted in close proximity to each wheel and typically may be set within the wheel well or other convenient location best suited to detect the emission from the sound signal generator in the event that it is actuated as a result of an abnormal tire pressure condition. In the illustrated embodiment, four transducers 12 are shown, one associated with each wheel. This number may be increased or decreased depending upon the number of tires to be monitored and, for example, a fifth transducer may be added for the spare tire, or additional transducers may be added to any truck with more than four tires. Also, the number may be decreased if one transducer is sufficient to respond to two or more wheel mounted devices.

In any event, each transducer 12 is operatively connected to an automatic gain control amplifier 34. The automatic gain control preamplifier is utilized in the event that a strong signal is applied to the amplifier which would cause desensitization of the circuitry due to the limiting characteristics of the amplifier. The AGC amplifiers 34 are powered and controlled by means of a regulator circuit 36 which typically supplies to each remote preamplifier 34 up to 2 milliamperes of current. The outputs of the several preamplifiers are fed by a lead 37 to a summing network 38 having an output to a first detector 40.

The first detecting stage 40 accepts any one or a number of carrier signals which are combined and fed into the detector. The first detection stage extracts the modulation envelope and applies it to an audio band pass filter 42. The audio filter 42 is designed to accept the modulation envelope within a predetermined frequency range which typically is between 27-44 kHz, eliminating all other signals that are not within the acceptable band pass. Typically, the audio filter may have a band pass characteristic on the order of 2 kHz.

From the audio filter 42 the signal is fed into a second detecting stage 44 which rectifies the sine wave into a DC signal level. This signal is then fed into a threshold comparator 46 which also has a reference DC signal from a lead 47 providing a threshold value for the comparator. The level of the DC signal from the second detecting stage at this point is directly proportional to the percentage of modulation of the originally received carrier frequencies. If this level exceeds the threshold value of the comparator, the output of the comparator switches, resulting in the actuation of a storage flip-flop 48 which serves as a memory device. The flip-flop connects through a driver 50 to a warning indicator 52, such as a light or buzzer as desired. A reset switch 54 is connected to the flip-flop 48 by means of which the warning light may be extinguished by closing the reset switch, which preferably is of a momentary contact type.

The transducers 12 which are suitably designd to operate reliably in the hostile environment that occurs under the vehicle chassis, respond to the sound input frequencies by converting them into an electrical signal which, in turn, is amplified by the automatic gain control amplifiers 34. These preamplifiers 34 are powered by the regulator circuit 36 which, in the illustrated embodiment and as shown in FIG. 3 is a zener regulator, one regulator for each amplifier. The regulator circuit 36 of FIG. 3 is comprised of a resistor 54 at the input side providing biasing current to a zener diode 56 connected in parallel with the capacitor 58. In order to supply the desired 2 milliamperes load current to the preamplifiers, the zener diode must be biased so that there is sufficient current available to ensure adequate regulation. In the illustrated circuits, the resistance is selected to ensure at least a minimum of 1 MA through the diode 56. The voltage of the regulator of this configuration is 8 volts, which is filtered by the capacitor 58.

The input voltage for the signal processor, as well as for the preamplifiers, is constant and independent of ignition switch actuation so that the system operates when the vehicle is in a completely static mode with the ignition key in the off position. The zener diode 56 for the processor was selected by determining the optimum voltage to minimize current drain for the CMOS devices and to minimize variation of characteristics as a function of temperature and voltage variations.

The summing network 38, which receives the several inputs from the preamplifiers is shown in detail on FIG. 4 and, in practice, the network must be capable of combining the four input signals without loading the preamplifiers 34. Preferably the preamplifiers must not be loaded with less than 1 kilo-ohm. The summing network is comprised of a plurality of resistors 60 connected in parallel to a lead 62 feeding into the first detecting stage 40. A variable resistor 64 is connected to the lead 62 and has a range of 1–5 kilo-ohms. Employing a 1 kilo-ohm input resistor for each channel, the desired load limit is not exceeded. The summing network provides a gain reduction of approximately 4 to 1.

Referring now to FIG. 5, there is illustrated a circuit diagram of the first detecting stage 40 which is an operational amplifier detector adapted to provide a good, consistent rectification characteristic and a low output impedance to drive the first post detection integrator (PDI). The operational amplifier detector functions as a half-wave rectifier that is linear over a wide range of signal levels. The circuit includes a capacitor 65 connected to an amplifier 66 across which is connected a diode 68 in parallel with a resistor 70. A second diode 72 is connected to the output of the amplifier 66 between the first diode 68 and the resistor 70. In a conventional detector, the diode barrier potential requires that the input signal overcomes this inherent threshold before the diode can rectify. Over a wide temperature variation, the barrier potential of the diode changes, causing a variation in the detector efficiency. Such variations are avoided using the operational amplifier detector of FIG. 5.

Figure 6:
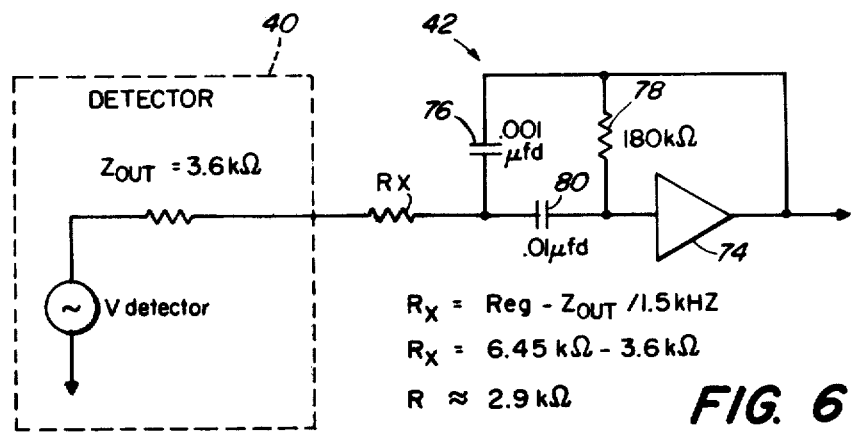
FIG. 6 is a circuit diagram of the audio filter employed in the processor.

Referring now to FIG. 6 of the drawing, there is illustrated a circuit diagram of the audio filter 42 which limits the acceptable frequency range of the modulation envelope. In the preferred embodiment, the audio frequency range is between 1 to 2½ kHz ideally being at 1.7 kHz (1700Hz) at the 3 db point. Filters with a low Q such as this normally have a distorted band pass characteristic, with the peak of the filter skewed toward the low end of the frequency range. However, for the present application, the skew characteristic is not significant. In the present filter, the multiple feedback network approach was employed in order to provide an active filter. A gain was provided in order to make up for the loss experienced in the summing network 38.

The input of the audio filter is made up of the PDI and detector circuit 40. The filter circuit includes an amplifier 74 across which is connected a capacitor 76 and a resistor 78. A second capacitor 80 is connected between the first capacitor 76 and the resistor connection 78. The filter circuit functions in a manner to provide a band pass on the order of 1 to 2½ kHz. It will be understood that the modulated signal typically may have a center frequency of 28 to 44 kHz with a modulation envelope on the order of 1–2 kHz and a 50% amplitude modulation envelope. Typically, the emitted coded signal is comprised of two discrete, simultaneous signals, one at 38 kHz and the other at 40 kHz, producing a modulation envelope of about 2 kHz (optionally 1.7 kHz at the 3 db point). The transducer is designed to have a band width of 28 to 44 kHz in order to accommodate for any shift in the frequencies of the emitted coded signals as a result of ambient conditions such as temperature, gas characteristics, etc. The processor is designed to pass through a true warning signal when the input signal from a signal generator attains a three volt level measured peak-to-peak with modulation characteristics as set by the comparator, all other signals being rejected.

The second detector 44 is provided to rectify the filtered signal from the audio filter 42 and apply it to a post detection integrator (PDI). This integrator is provided to eliminate virtually all of the frequency components above DC. The circuit has been designed so that an incoming signal of the proper characteristic will have a minimum duration, typically 0.38 seconds, in order to pass, thereby further defending the system against false actuation by spurious short term signals. The integration time may be varied according to circuit operating characteristics and other factors.

The comparator 46 receives the DC (rectified AC) output from the second detection stage 44 and provides a fixed threshold which is compared with the DC level from the second PDI. When this level exceeds the threshold, the output is driven to a low level, setting the flip-flop 48. The flip-flop 48 functions as a memory to store the event that the threshold coming into the comparator 46 exceeded the fixed threshold. This information is held by the flip-flop until the reset switch 54 is closed to clear the circuit. The driving circuit 50 for the warning indicator is energized from the switched power control by the ignition system. Typically the light is driven by a power amplifying device which will also provide a ground when the threshold is exceeded.

Referring now to FIG. 7, there is illustrated a tire pressure sensing device adapted to emit coded sound signals at two different pressure levels of the tire. Thus, as the tire pressure drops, time-spaced signals will be emitted which, when detected and calculated, are used to indicate the pressure remaining before the pressure in the tire is so low as to render a vehicle immobile. The circuitry for performing the calculations is shown in FIG. 8.

In FIG. 7 a pressure-responsive sound signal generating device 81 includes a cylindrical housing 82 mountable to a wheel for communication with the interior of a tire. A piston 83 is mounted for reciprocation within the cylinder and is urged normally downward by means of a compressed spring 84 between a perforated plate 85 and a disc 86 on top of a piston stem 87. The lower end of the piston 83 is sealed against the inner walls of the cylinder by means of a rolling seal diaphragm 88, and the lower face of the piston communicates with the pressure of the tire through passages 89. The stem 87 is formed with a passage 87' and is formed with medial ports 87" in the sides thereof. O-rings 90 and 91 are mounted to the stem above and below the ports 87" and form a sliding seal with a fixed sleeve 92. The sleeve 92 is formed with spaced ports 93 and 94. The sleeve 92 is mounted to the cylinder by means of a perforated annulus 95, and a sound signal generator 96 is mounted at the upper end of the cylinder.

The device operates as follows: Under normal operating tire pressure the piston will be in the position illustrated in FIG. 7 with the port 87" in the closed position shown. In the event of a drop in tire pressure, the force of the spring 84 will cause the piston to move downwardly, first bringing the stem port 87" into registration with the sleeve port 93. This will release air, causing the sound generator to emit a first low pressure sound signal. If pressure continues to drop in the tire, the piston will move down further, first closing off the port 93 and then opening the port 94 to release another sound signal. These two signals will be detected sequentially by the transducer proximate to the device 81 and convert them into electrical signals for processing through the circuitry of FIG. 8.

Figure 8:
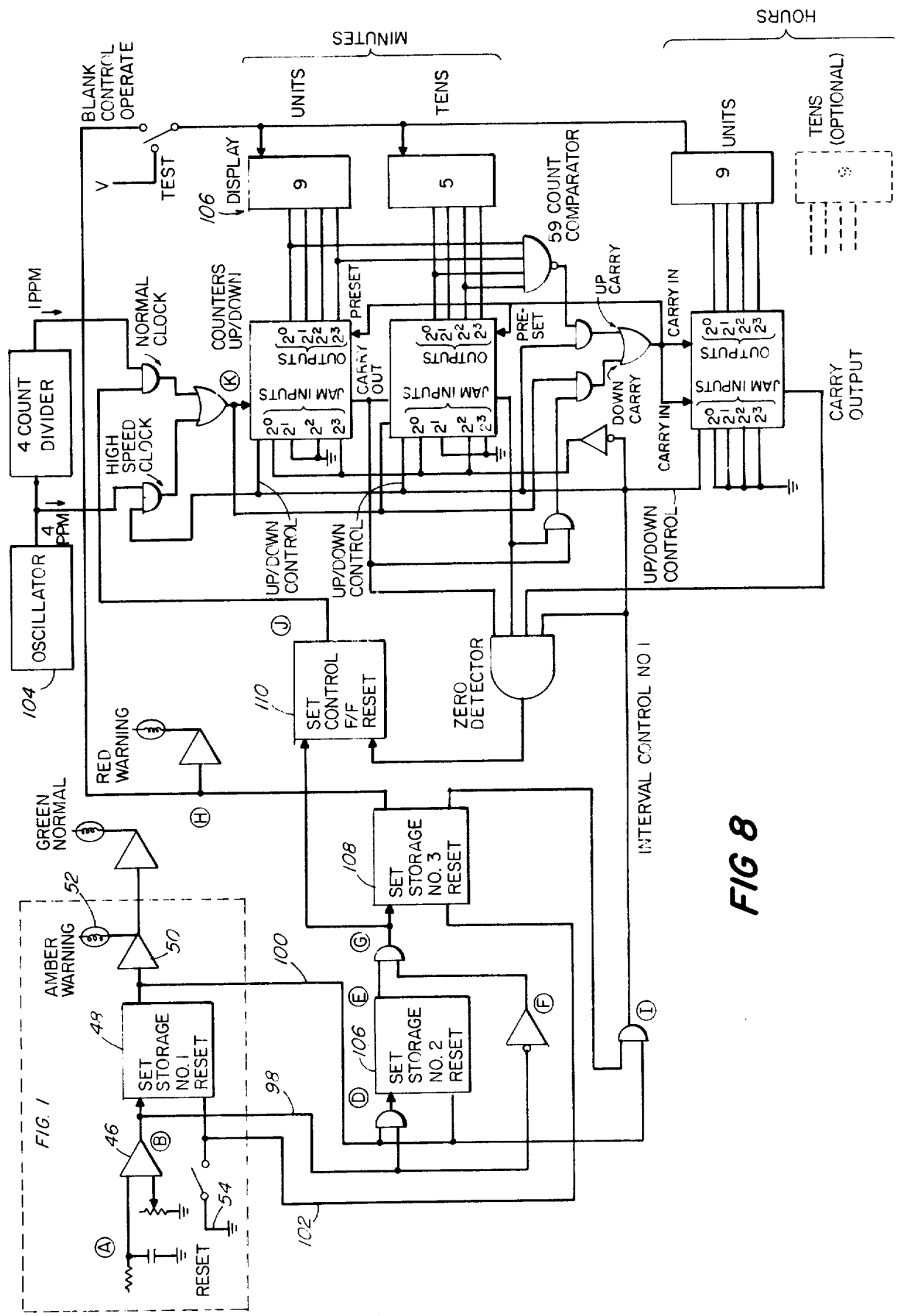
FIG. 8 is a block diagram of the circuitry for calculating rate loss.
Figure 10:
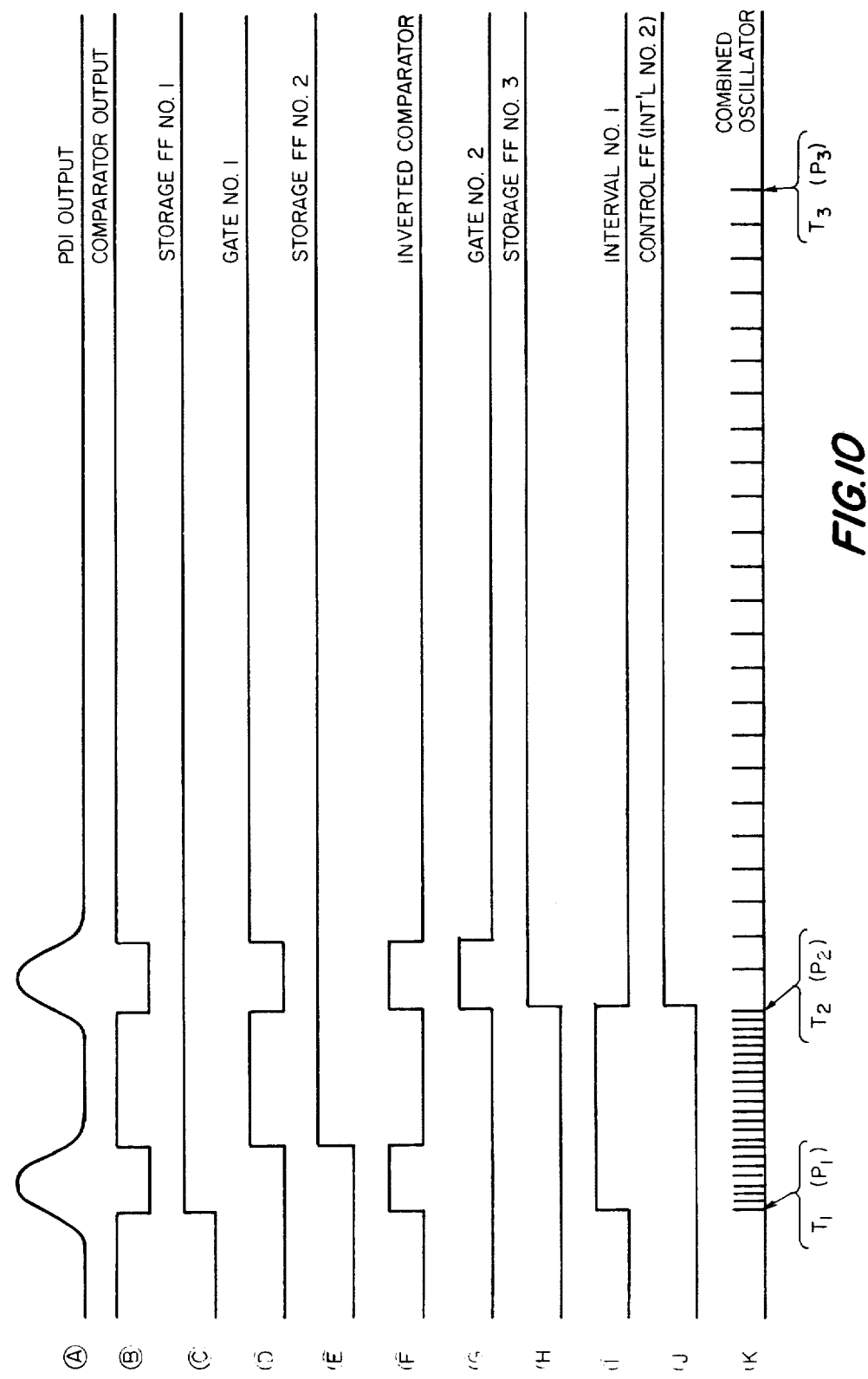

In FIG. 8, the calculating circuitry may be added as a functional module to the processing circuitry of FIG. 1, connections being made by leads 98 and 100 to either side of the flip-flop 48. A reset lead 102 is also connected to the reset switch 54.

Figure 9:
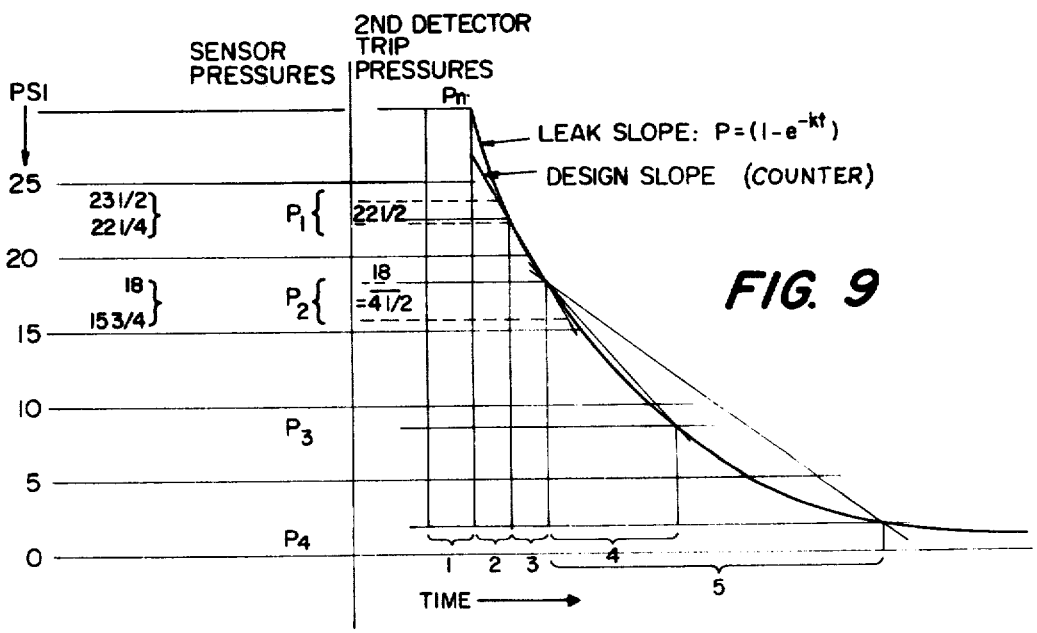
FIG. 9 is a graphic representation of the operating characteristics of the rate loss system, and, FIG. 10 is a waveform diagram for use in demonstrating the operation of the system.

The calculating circuitry functions in the following manner. The circuitry is designed to measure the time interval between the two emissions from ports 90 and 92, these being termed pressures P1 and P2, and then compute the time required to reach pressure P3 corresponding to the immobility pressure value of 8.5 p.s.i. which is one-third the normal pressure of 25 p.s.i. (PN). The values are those calculated for a standard tire. For the type of tire known as a run flat tire, the immobility pressure typically is considered to be about 1 p.s.i. (P4). The slope of the sampling between the P1 and P2, as shown in FIG. 9, is four times that at P3. The time measurements between P1 and P2 are made by an oscillator or other pulse generator 104, whose upcount rate is four times that of real time. At the expiration of P2, these pulses are converted to real time with a digital clock display typically employing light-emitting diodes 106 counting or displaying real time in reverse. The module senses the state of the processor comparator 46 at the flip-flop 48. The storage flip-flops 48, 106 and 108, together with AND gates, generate interval control signals representing P1 and P2.

The first signal ($P_1$) sets the storage flip-flop No. 1 (48) which performs two functions; namely, (1) it enables the gate to flip-flop No. 2 (106) with a high level; and, (2) it starts the high speed clock (first part of waveform K) to count up in the time clock circuit. When the comparator 46 recovers, flip-flop No. 2 (106) is set, enabling the gate that feeds flip-flop No. 3 (108). The second signal ($P_2$) sets the storage flip-flop No. 3 (108) and the control flip-flop 110. When flip-flop No. 3 (108) is set, the time interval No. 1 goes low, stopping the high speed clock.

The control flip-flop 110 now allows the real time clock to feed the time clock which is now in a countdown mode at the end of interval No. 1. The time clock circuit now counts down towards zero in real time, displaying the time to go. When each decade is at zero, the control flip-flop 110 is reset by the zero detector, stopping the counting by inhibiting the real time clock.

When a zero in each decade is detected by a two-input AND gate, a carry is generated through the gating circuit and a preset is sent to each decade. This reads into the counter the information which is available on the jam inputs of each decade.

It will be noted that the carry between the minutes and hours has two carry paths. These are necessary because a carry must be generated at sixty like a real digital clock in the upmode of the time clock circuit.

| 0 Hrs. | 59 Min. | |
|---|---|---|
| | | ← CARRY |
| 1 Hr. | 00 Min. | |

Likewise, a carry must be generated when zero is obtained in the countdown mode along with presetting a "59" into the first two decades so that time is displayed like a clock.

| 1 Hr. | 02 Min. | |
|---|---|---|
| 1 Hr. | 01 Min. | |
| 1 Hr. | 00 Min. | |
| | | ← CARRY GENERATED AND |
| 0 Hrs. | 59 Min. | ← PRESET 59 INTO CLOCK |
| 0 Hrs. | 58 Min. | |

The flip-flop No. 2 is reset with the ground assertion only which can only happen when flip-flop No. 1 is reset (output low). The AND gate uses a high input to operate.

The gating circuit below the oscillator and the four count divider of FIG. 8 connects with the oscillator logic to enable the oscillator to pulse the counters at the start of the first interval and to stop the oscillators from pulsing the counters at the rate of four times that of real time during the second interval. The gating circuit selects the clock rate to be used during the interval. The time clock up/down control is provided by interval counter line No. 1 and the clock rates are controlled by both interval control line No. 1 and No. 2. All storage and counting circuits are active with the ignition switch in the off position. Therefore all up and down counts are performed in memory. Ignition actuation has no affect on the accuracy of the read-out regardless of the point of actuation and the sequence of either counting direction.

The system thus functions to provide the operator with a positive indication as to the time or pressure remaining on the affected tire before the vehicle becomes immobile. This time is presented on the digital display 106 and is calculated by the measurement taken between P1 and P2, as shown in FIG. 9. The time remaining to reach P3, or immobility for a standard tire, is dependent upon the leakage rate calculated between P1 and P2. In the event that the vehicle is equipped with what is known as a run flat tire, which can operate under certain conditions for a period of time with substantially little or no air pressure, the calculation would be modified to extend the time remaining to reach P4. In either event, the operator is provided with direct data display which may be presented on the dashboard so that the operator will know how much longer he may drive before the leaking tire causes an immobile condition of the vehicle. Preferably this information is displayed digitally in the form of real time in hours and minutes, although it could also be displayed in terms of remaining pressure. Obviously other types of displays, such as a dial indicator, may be used to advantage.

While the system for determining the rate of loss of tire pressure and the useful time remaining has been described in conjunction with the disclosed acoustical system, numerous modifications thereto will appear to those skilled in the art. For example, sound signal generators other than the specific devices illustrated could be used. Other such devices are disclosed in the references cited above. Also, the rate loss circuitry could be modified for use with tire pressure monitoring systems which do not use acoustic signals. By way of example, systems that use radio transmission, inductive coupling, mechanical switching and other means to transmit pressure information from the tire or wheel to a fixed point on the chassis and thence to the driver, can utilize the rate loss features of this invention by connecting it to the system with appropriate substitution of components to replace acoustic components with those functionally equivalent parts such as radio receivers, etc.

Having thus described the invention, what I claim and desire to obtain by Letters Patent of the United States is:

1. A system for monitoring the pressure of a pneumatic tire and determining the rate of loss of such pressure in the event of a leak, comprising
   (a) signal generating means operatively associated with said tire and adapted to produce a signal at each of at least two different, time-spaced low pressure levels,
   (b) transducer means spaced from said tire and adapted to detect said signals and generate electrical signals therefrom,
   (c) electrical processing means connected to said transducer means and adapted to measure the time lapse between signals and calculate therefrom the time remaining for said pressure to reach a critical level, and,
   (d) display means connected to said processing means and adapted to display said remaining time in visual form.

2. A system, according to claim 1, wherein said signal generating means includes a sound signal generator.

3. A system, according to claim 2, wherein said signal generator includes means for generating at least a pair of sound signals of two discrete frequencies providing an amplitude modulated coded sound signal from the interaction of said two frequencies.

4. A system, according to claim 2, wherein said processing means includes detecting and filtering means adapted to demodulate said signal and pass a signal only within a predetermined frequency range.

5. A system, according to claim 1, wherein said processing means includes clock means responsive to signals produced at said two pressure levels and counting means connected to said clock means and to said display means for converting the output of said clock means into display signals.

6. The method of determining the rate of loss of pressure in a pneumatic tire on a vehicle having means to produce a signal at each of at least two different tire pressures, comprising the steps of
   (a) detecting at least two of said signals,
   (b) measuring the elapsed time between said signals,
   (c) calculating from said elapsed time the useful running time remaining for said tire, and
   (d) displaying said running time to the operator of said vehicle.

* * * * *